United States Patent
Clark

(10) Patent No.: US 9,565,229 B2
(45) Date of Patent: Feb. 7, 2017

(54) SYSTEMS AND METHODS FOR TRANSMITTING DATA

(71) Applicant: VMware, Inc., Palo Alto, CA (US)

(72) Inventor: Jonathan Clark, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/921,042

(22) Filed: Jun. 18, 2013

(65) Prior Publication Data

US 2014/0372568 A1 Dec. 18, 2014

(51) Int. Cl.
*G06F 15/16* (2006.01)
*H04L 29/06* (2006.01)

(52) U.S. Cl.
CPC ......... *H04L 65/602* (2013.01); *H04L 65/4084* (2013.01); *H04L 65/80* (2013.01)

(58) Field of Classification Search
USPC .................................................. 709/219, 217
See application file for complete search history.

(56) References Cited

U.S. PATENT DOCUMENTS

2006/0092173 A1* 5/2006 Hall ..................... G09G 3/2051
345/598
2007/0263007 A1* 11/2007 Robotham ................ G06F 3/14
345/581
2007/0294333 A1* 12/2007 Yang ................. G06F 17/30899
709/203
2010/0064002 A1* 3/2010 Levanon .................... G06F 3/14
709/203

OTHER PUBLICATIONS

Wagner, Stefan; "Bompo Blog"; 36 pages; available at http://bompo-blog.appspot.com/2012/6/Streaming-textures-with-progressive-JPEG;.

* cited by examiner

*Primary Examiner* — Vivek Srivastava
*Assistant Examiner* — Hermon Asres

(57) ABSTRACT

A server receives an update image for transmission to a client and encodes and compresses the update image data using a progressive encoding scheme. In one embodiment, the image data is encoded using progressive JPEG encoding and then into a base64 text string. When insufficient network bandwidth is available to transmit all of the image data for the update image, the server transmits only a first portion of the encoded image data, which is sufficient to fully reproduce the original update image but at a lower quality. When more network bandwidth becomes available, an additional portion of the encoded image data is transmitted to the client. The client is able to append the additional portion to the first portion to refine the image represented at the client. This mechanism may be implemented using unmodified web browsers and servers to remote a computer graphical user interface display.

21 Claims, 3 Drawing Sheets

SYSTEMS AND METHODS FOR TRANSMITTING DATA

BACKGROUND

At least some known computing systems include remote client(s) or browser(s) that support various mechanisms for receiving data from a server, wherein the data may include screen changes. U.S. Patent Application Publication 2012/0324358, published Dec. 20, 2012 and incorporated herein by reference in its entirety, describes in detail an exemplary protocol for remoting a graphical user interface from a virtual machine to a client web browser via HTTP GET requests. Each GET request form the client web browser is matched to a screen update, which comprises an image taken from a portion of the graphical user interface that has recently changed due to applications or the operating system drawing to the display frame buffer.

U.S. Patent Application Publication 2013/0050253, published Feb. 28, 2013 and incorporated herein by reference in its entirety, describes a technique for compositing image data comprising overlapping display update images on a display screen at a remote user terminal using a standard web browser. As described, areas of a graphical user interface (GUI) that is modified by applications or the operating system are identified and bounded by an update rectangle, which is read from a frame buffer at the server and converted into an update image for display at a browser at a corresponding offset on the user's display, thereby updating the user's display with the GUI update generated at the server. When a subsequent image is received by the client it may be composited with previously received image updates by overlaying the new image on the previously received image data. The browser may internally maintain each update image as a separate entity such as an image object until a new image is received that entirely covers the previous image or even the entire display area.

Display remoting can adversely impact user experience, which is sensitive to display quality, latency, and frame rate. Display remoting protocols attempt to balance these factors given the available system resources, such as compute and network bandwidth. For example, the display remoting server may be configured to compress or encode the GUI updates prior to transmitting such data to the remote client(s) to accommodate the available network bandwidth. For example, the server may set the bandwidth budget per frame or per unit of time to an available number of bytes. However, it may be difficult to predict the quality level that the server or encoder therein should use when compressing an image, e.g., using JPEG image compression, to produce an image that will closely match the available bandwidth without exceeding it, thereby maximizing the user experience within the constraint of the available network bandwidth.

One approach to produce an image that matches a required output size is to repeatedly and iteratively encode the same image while adjusting the quality settings until the desired quality is achieved. However, this approach requires a relatively high central processing unit (CPU) and therefore a relatively high latency overhead. Another approach may be for the server to attempt to guess the quality setting based on the result of previous frames or images. However, this approach may not work when there is a sudden change in the image content being sent to the client(s). In all of these approaches, an initial low quality version of the image needs to be refined to high quality when spare bandwidth becomes available. Moreover, being able to later improve the image quality for regions of the screen that are already displayed but have not changed can be inefficient, as it may require duplication of data already sent.

SUMMARY

Embodiments described herein may be implemented using unmodified web browsers and servers to remote a computer graphical user interface display in bandwidth-efficient manner. The server receives an update image for transmission to a client and encodes and compresses the update image data using a progressive encoding scheme. In one embodiment, the update image data is encoded using progressive JPEG encoding and then into a base64 text string. When insufficient network bandwidth is available to transmit all of the image data for the update image, the server transmits only a first portion of the encoded image data, which is sufficient to fully reproduce the original update image but at a lower quality. When more network bandwidth becomes available, an additional portion of the encoded image data is transmitted to the client. The client is able to append the additional portion to the first portion to refine the image represented at the client.

DETAILED DESCRIPTION

The presently described graphical user interface (GUI) remoting system is motivated in part by a realization that standard web browsers can be programmed using JavaScript to receive image data as a series of base64-encoded strings. Base64 is a well-known binary-to-text encoding scheme for representing binary data as a text string. In this form, the client can refine a previously received image by simply appending newly received image data to a previously accumulated string and pass this to the Image object to cause the refined JPEG image to be decoded using native JPEG decompression code. Even when a first image object is only partially visible due to other image objects being partially overlapping the first image object, the first image object may be refined to provide an improved image quality over time with fast initial rendering, and "build to perfect" a graphical representation of a remote display. Thus, the system herein described may be considered an enhancement to the remoting systems described in U.S. Patent Application Publications 2012/0324358 2013/0050253 mentioned above, although it should be recognized that methodology described herein may have utility in other contexts as well, e.g., using WebSockets or other stateful network connections that allows a server to "push" data to a client without first receiving a request. Hence, the systems described in the previous patent applications should be considered as only example base technologies, and the technology described here is not limited to those specific implementations.

Figure 1:
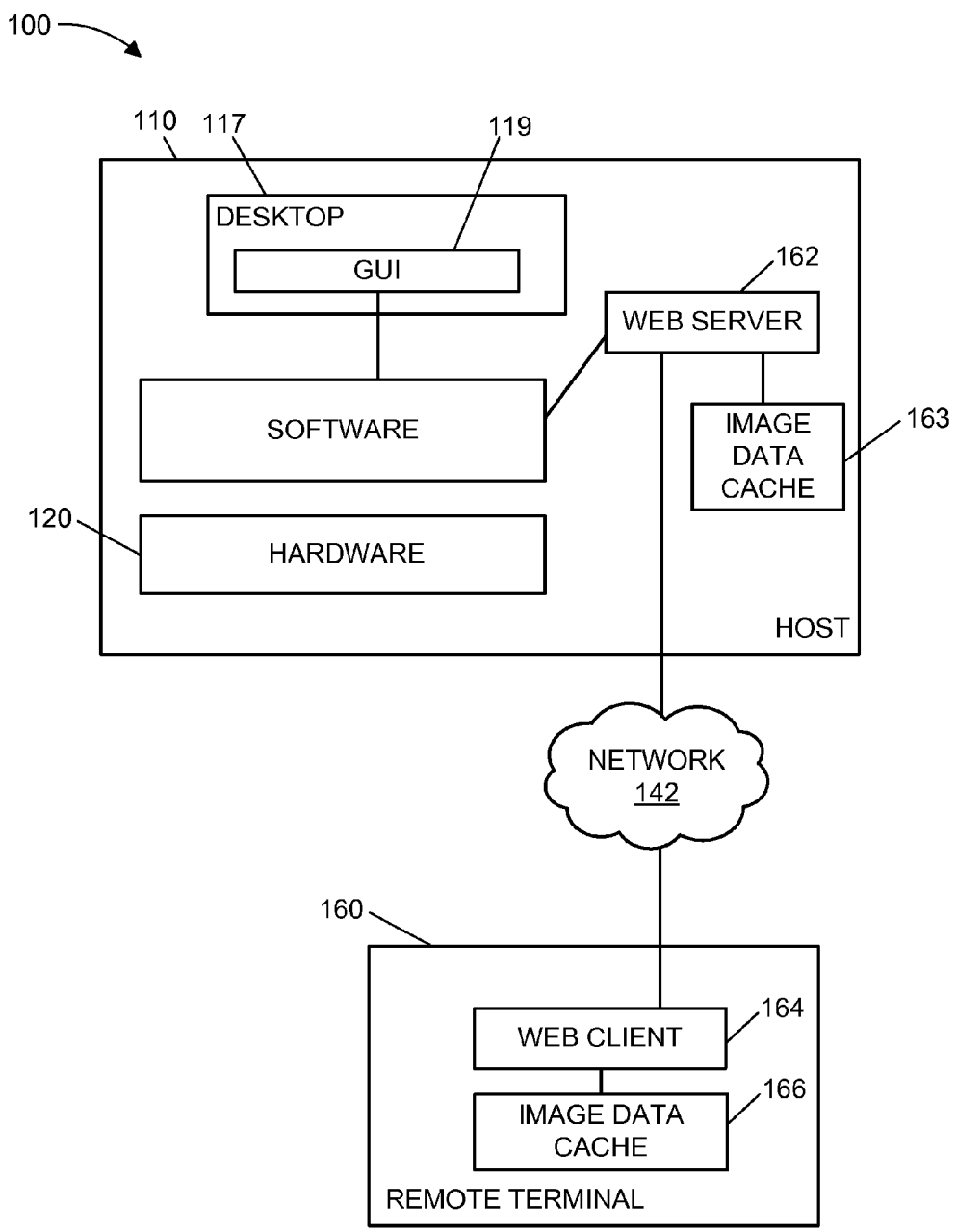
FIG. 1 shows an exemplary system that includes a physical computer system or host and client on which the described processes can be implemented.

FIG. 1 shows an exemplary system 100 that includes a physical computer system or host 110. Host 110 includes hardware 120 and software 124 running on hardware 120 such that various applications may be executing on hardware 120 by way of software 124. Functionality of software 124 may alternatively be implemented directly in hardware 120, e.g., as a system-on-a-chip, firmware, a field-programmable gate array (FPGA), etc. Hardware 120 includes at least one processor (not shown), wherein each processor is an execution unit, or "core," on a microprocessor chip. Hardware 120 also includes a system memory (not shown), which may include a general volatile random access memory (RAM), a network interface (NIC), and other devices, as would generally be expected in computer systems.

In the exemplary embodiment, an end user may connect to, and interact with, host 110 using a remote terminal 160 that is capable of communicating with host 110 via a network 142, which may be the Internet, a LAN, a WAN, or any combination thereof. Remote terminal 160 may be a desktop computer, laptop, mobile device, electronic tablet, thin client, or other similar device. Remote terminal 160 is capable of displaying a graphical user interface (GUI) 119 generated by the operating system and applications running inside host 110 to the end user at remote terminal 160 using a computer display (not shown) or similar device. Remote terminal 160 may also be capable of receiving user input from the end user and transmitting the received user input to host 110.

Host 110 provides at least one desktop 117 (only one being shown in FIG. 1) to a user of host 110. The term, "desktop" refers to an interactive user interface, typically implemented using a graphical user interface that displays application and operating system output to a user and accepts mouse and keyboard inputs. In a virtual desktop infrastructure (VDI) deployment, each desktop 117 may be generated by a corresponding virtual machine (not shown). A typical VDI deployment may have tens or hundreds of virtual machines distributed across many physical hosts exporting desktops to as many users in disparate locations. As mentioned, Desktop 117 is an interactive user environment provided by the applications and an operating system (not separately shown) running on host 110, and that includes a graphical user interface (GUI) 119 that may be spread across one or more screens or displays (not shown). Other outputs, such as audio, indicator lamps, tactile feedback, etc., may be provided. Desktop 117 may also accept user inputs, from remote terminal 160 over network 142, such as keyboard and mouse inputs, which are injected into desktop 117 in an appropriate way, e.g., using an agent or virtual device interfaces (not shown) in a manner familiar to those knowledgeable with machine virtualization.

In the exemplary embodiment, host 110 also includes a web server 162 that is in communication with software 124 and an encoder (not shown) that is part of software 124. Web server 162 is in communication with a web client 164 via a network 142. In some implementations, web server 162 may instead be implemented on a stand-alone server (not shown). Web client 164, in the exemplary embodiment, is a conventional web browser that is configured to run on remote terminal 160 and connects to web server 162 as necessary to, for example, receive GUI data from web server 162. As explained in more detail below, web client 164, in the exemplary embodiment, is configured to form or establish one or more connections with web server 162. Accordingly, data, such as display or screen changes may be transmitted from web server 162 to web client 164 via the connection(s) therebetween.

Host 110 and remote terminal 160 each include an image data cache 163, 166, used for storing image data associated with update images that reflect changes to GUI 119. Each image data cache 163, 166 may be implemented in any manner convenient using system memory (not shown) on host 119 and client 160. In one embodiment, the image data caches 163, 166 are suitable for storing base64 encoded strings representing progressive JPEG-encoded update images.

Figure 2:
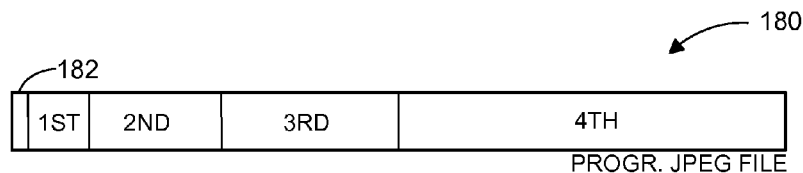
FIG. 2 shows a block diagram illustrating in by way of example a progressively-encoded image.

FIG. 2 shows a block diagram illustrating in by way of example a data format 180 for a progressively-encoded image, which may be an image encoded using JPEG image compression. Image format 180 includes a header portion 182 that provides meta data regarding the image, such as its dimensions in pixels and other encoding parameters. After the header there are a number of encoding passes (or "scans") labeled "1st," "2nd," "3rd," and "4th." It should be recognized that fewer or more encoding passes may be created when encoding the image. Each encoding pass provides data that enhances the clarity of the image data that precedes it. Thus, the 1st coding pass includes all the data necessary to recreate the original image but with significantly reduced image quality. The 2nd pass includes additional data that can be used to enhance the image generated by the 1st pass, and the 3rd pass includes image data that can be used to enhance the image generated by the 2nd pass, and so on. Thus, because of the nature of progressive encoding, the original image can be reproduced with less than all the image data. Hence, the encoded image data can be truncated at any point after the first image pass and yet a full reconstruction of the original image can be generated with the amount of detail depending on the amount of image data provided.

Figure 3:
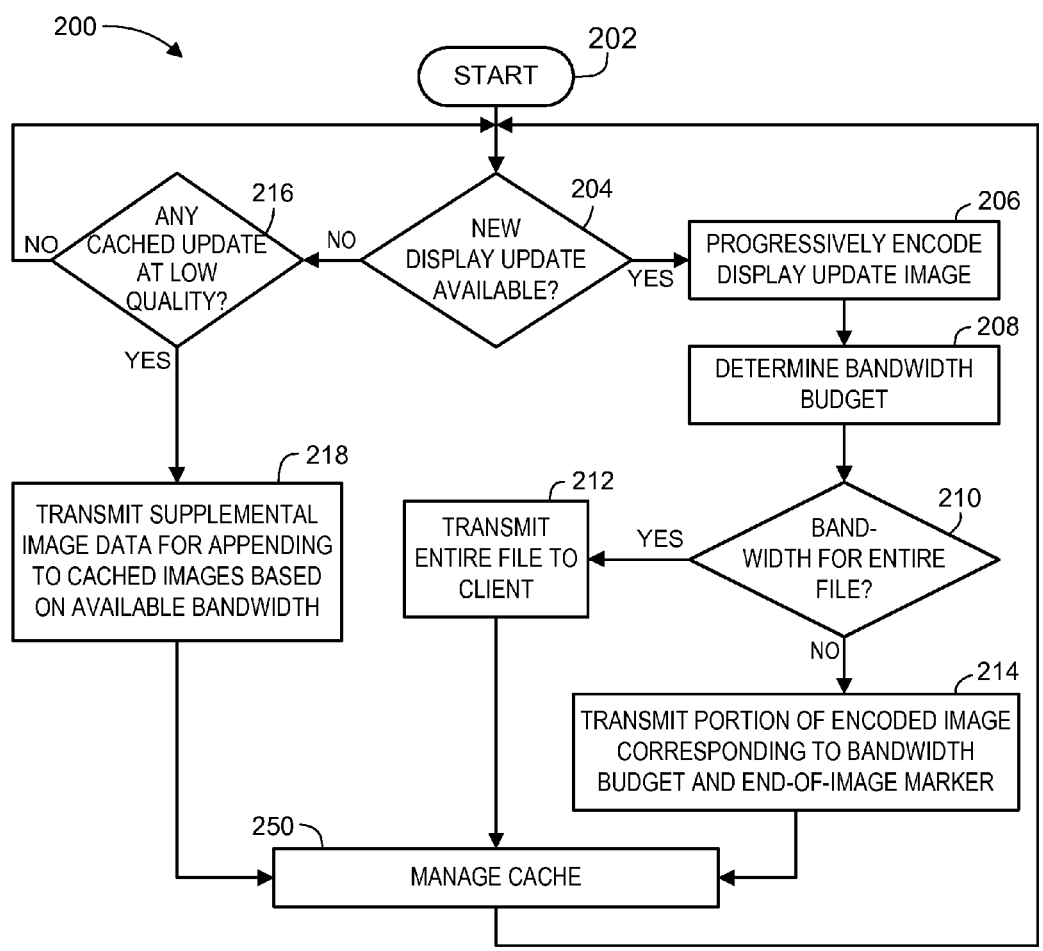
FIG. 3 shows a flow chart illustrating by way of example a procedure for transmitting display updates from a server system over a network having a limited bandwidth while preserving user experience.
Figure 4:
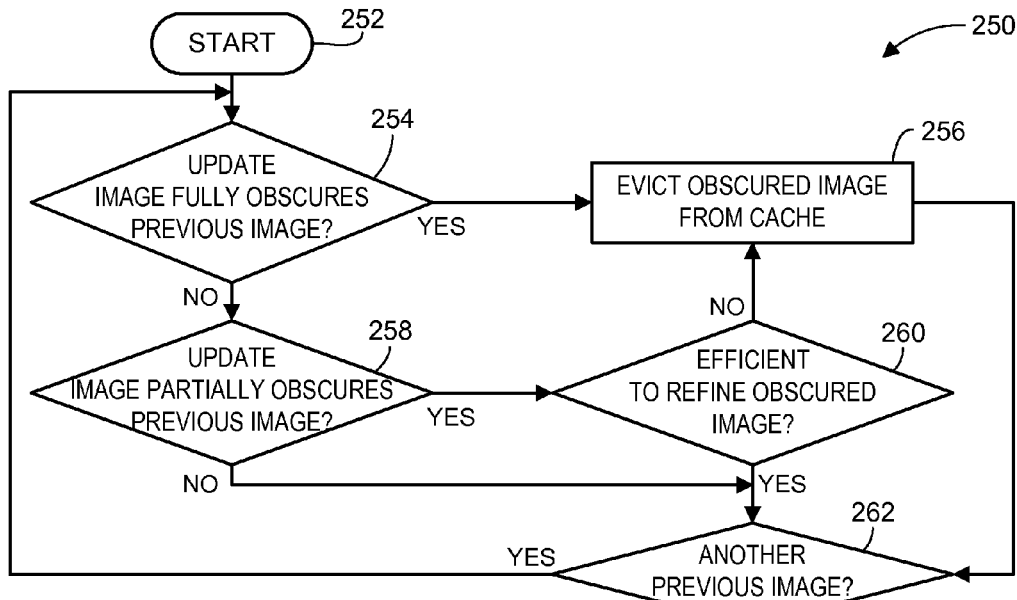
FIG. 4 shows a flowchart which illustrates by way of example a method for managing an update image cache.
Figure 5:
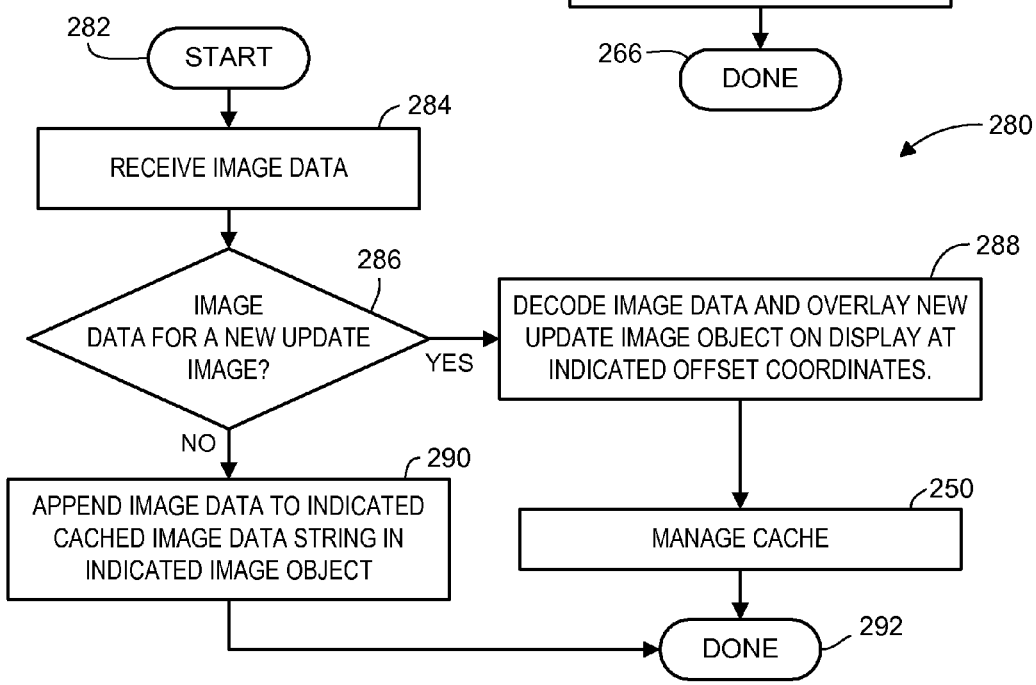
FIG. 5 shows a flowchart that illustrates by way of example a procedure for a web client to execute when receiving image data.

FIGS. 3, 4, and 5 shows flow charts illustrating exemplary methods for transmitting data from web server 162 located within host 110 (shown in FIG. 1) to web client 164 located within remote terminal 160 (shown in FIG. 1). These methods may be embodied within a plurality of computer-executable instructions stored in one or more memories, such as one or more computer-readable storage mediums. Computer storage mediums may include non-transitory storage medium such as volatile and nonvolatile random access memory, removable and non-removable mediums implemented in any method or technology for storage of information such as computer-readable instructions, data structures, program modules or other data. The instructions may be executed by one or more processors to perform the functions described herein.

FIG. 3 shows a flow chart 200 illustrating by way of example a procedure for transmitting display updates from a server system over a network having a limited bandwidth while preserving user experience. The procedure begins as indicated at start block 202 and proceeds to operation 204 wherein it is determined whether any graphical display updates are available. Graphical display updates may become available when an application of a component of the operating system in a desktop modifies GUI 119 (FIG. 1). Each display update may be an image extracted from a rectangle of pixels that bounds the modified portions of GUI 119, e.g., as represented in a frame buffer. U.S. Pat. No. 8,441,484, granted May 14, 2013 and incorporated herein by reference, describes an exemplary technique for identifying display update images from a frame buffer.

If a display update image is available, then the procedure flows to operation 206, wherein the display update image is encoded using a progressive image encoding scheme. Then a determination is made in operation 208 as to the available network bandwidth for transmitting display updates to remote terminal 160. Then in operation 210, it is determined whether the available bandwidth is large enough to accommodate transmitting the entire encoded display update image to remote terminal 160. If so, then the procedure flows to operation 212 wherein the all of the encoded image data is transferred to the client. The procedure then manages the image cache in operation 250, an operation that is further described below with reference to FIG. 4. After the cache management operation, the procedure returns to operation 204.

If, at operation 210, it is determined that the available bandwidth is not sufficient to accommodate all of the encoded image data, then the procedure flows to operation 214, wherein only a portion of the encoded image that corresponds to the available bandwidth is transmitted, along with an "end of image" marker. For example, if sufficient network bandwidth is available for transmitting 2 encoding passes, but not the third complete encoding pass, only the amount the image data corresponding to the first two encoding passes (plus header or other formatting information) and an end-of-image marker is transmitted as the encoded update image data to remote terminal 160. The method then flows to operation 250 which is more fully described below with reference to FIG. 4.

If, at operation 204, there are no display updates available, then the procedure continues to operation 216, wherein it is determined whether any cached updates are present in the cache for which all of the encoded image data was not transmitted to remote terminal 160. This occurs when only a first portion of an update image was previously transmitted to the client in operation 214, in which case the remote terminal is currently presenting an image update to the user at less than optimal quality due to bandwidth constraints. If no such image is present in the cache, then the procedure returns to operation 214. However, if such a cached image is present, then procedure flows to operation 218 wherein an additional portion ("supplemental image data") of the update image data is transmitted to remote terminal 160 so that remote terminal 160 can use the supplemental image data to qualitatively enhance the update image (at least a portion of which is) presently being displayed to the user without having to retransmit any image data.

When there are multiple images in the cache for which only a portion has been transmitted to remote terminal 160, a selection criteria may be implemented to determine a priority of selection of available images. For instance, images with the fewest number of transmitted encoding passes may be prioritized over images with a larger number of transmitted encoding passes. When you have a tie between multiple update images having the same number of encoding passes, the largest image for which the next encoding pass can be accommodated by available network bandwidth may be selected, or alternatively, the newest image (most recently added to the cache) or oldest (longest residing update image) may be prioritized. Furthermore, contents of the images may be analyzed and compared so that images for which users may find lower quality rendering more objectionable, such as text or line drawings, may be prioritized over images for which low quality rendering is less objectionable, such as smooth color gradients of the type often found in window desktop backgrounds (sometimes called "wallpaper"). It should be noted that an assessment of bandwidth availability can be used to determine how many additional encoding passes to transmit, such not all of the remaining image data for a selected image may be transmitted. Finally, in one embodiment, a fraction of an encoding pass may be transmitted if there is insufficient bandwidth to transmit an entire encoding pass at a particular time.

FIG. 4 shows a flowchart 250 which illustrates by way of example a method for managing an update image cache. The cache is maintained by both the server and the client, but the client of course may have partial image data for each (or some) update image in the cache. The procedure starts as indicated at start block 252 and proceeds to operation 254 wherein it is determined if the current update image results in a first previous update image becoming fully obscured. A previous update image may be considered fully obscured when every pixel of the display frame associated with the previous update image is included in one of the subsequent update images, including the current update image. According to one embodiment, update images may overlap one another such that only the "top most" or "most recent" update image is fully visible. Each time a new update image is identified, each previous image may be checked to see if it has become fully obscured as a result of the new update image. This can be determined a number of ways. For instance, a list of update images present in the cache can be maintained wherein each entry includes coordinates for top left corner and lower right corner for the update image within a display frame buffer, an index value or memory address that identifies the particular image, and an order of recentness, such as a time stamp or incrementing value, or wherein the order can be implicitly determined by the order of the entries in the list, e.g., using a linked list data structure. Each time a new image is added to the list, each image listed is checked to see if it has become fully obscured by more recent images. If the first image checked is fully obscured at operation 254, then the procedure flows to operation 256 wherein all the obscured image is evicted from the cache. The portion of memory storing the evicted image data is released or otherwise made available to new data and the evicted image is removed from the list. The procedure then flows to operation 262 wherein it is determined whether there is another previous image to be checked and if not the new update image is added to the cache in operation 264 and the procedure is completed as indicated by done block 266.

If, in operation 262 another previous update image is available to be checked, then the procedure returns to operation 254. If, in operation 252, the previous update image is not fully obscured, then the procedure flows to operation 258 to determine whether the previous update image is partially obscured. An image may be considered to be partially obscured by the current update image when at least one pixel of the display frame associated with the previous update image is associated with the current update image and at least one pixel of the display frame associated with the previous update image is not associated with any subsequent update image. If the previous update image is not partially obscured, then the procedure flows to operation 262. Otherwise, the procedure flows to operation 260 to determine whether it is efficient to refine the obscured image. The server may determine, for instance, that it is more efficient in terms of bandwidth to retransmit the portions of the partially obscured update image that are still visible to the user than to transmit additional encoding passes. If it is determined that retransmission of the visible portions of the partially obscured update image is more efficient, then the procedure flows to operation 256 wherein the partially obscured update image is evicted from the cache and a new update image encompassing the regions of the partially obscured image is scheduled for capture from the frame buffer (this step not shown in flowchart 250). However, if it is determined that continuing to refine the partially obscured update image is more efficient, i.e., would take less network bandwidth, than sending a new image, then the procedure returns to operation 262. When there are no more previous update images at operation 262, then the procedure flows to operation 264 wherein the new update image is added to the cache and the procedure then ends as indicated by done block 266.

FIG. 5 shows a flowchart 280 that illustrates by way of example a procedure for a web client to execute when receiving image data. The procedure begins as indicated at start block 282 and proceeds to operation 284 wherein image data for an update image is received. Image data may be received as a string of base64 encoded image data as previously described, but also with some meta data indicating an index or other value indicating an identity of the image associated with the image data and coordinates for displaying the update image at a proper location on a computer display or window to, e.g., reconstruct a graphical user interface at remote terminal 160 that is generated at host 110. The meta data may implicitly or explicitly identify whether the image data is for a new or previous update image. For example, if the index value is one that was previously used, it may be presumed by remote terminal 160 that the image data is for refining previous update image, or the meta data may explicitly indicate that the accompanying image data is for a new or existing update image.

At the next operation 286, it is determined whether the new image data is for a new update image or a previous update image. If the image data is for a new update image, then the procedure flows to operation 288 wherein the image data is decoded and provided to a new image object that is displayed in overlaying relation to previous image objects at offset coordinates provided with the meta data. The procedure then flows to operation 250, wherein the image cache is managed. The cache at the client may be managed identically to that of the server as described above with reference to FIG. 4 using an identical algorithm to evict images, or it may evict images at the direction of the server. That is, the server may perform the image eviction selection algorithm, and then pass identities (e.g., using an index value) of evicted images to the client which then acts to evict the identified images from its own cache. The new update image is also added to the cache. Under some circumstances, the new update image may be not added to the cache, for example when all the image data for that image is received from the server such that no additional refinement is possible, then it may be determined that no actual image data needs to be stored in the cache. Once the cache management operation is complete in operation 250, the procedure ends as indicated by done block 292.

If the received image data is determined to be supplemental image data for a previously received update image, then the procedure flows from operation 286 to operation 290. At operation 290, the web client receives the additional image data and appends it to existing image data for the image object for the update image identified by the meta data. The appending operation may include removing the end-of-image marker at the end of the stored string of image data before appending the supplemental image data. The appended string of image data is then passed to the image object corresponding to the update image, causing the refined JPEG image to be decoded using native decompression code, which results in the displayed image being refined to a higher quality representation of the original image extracted from GUI 119. The procedure then ends as indicated by done block 292. In one embodiment, if the supplemental image data completes the transmission of all image data for the update image, then a flag or other indication may be sent to the client to indicate that all image data for that image is transmitted allowing the client to delete the image data for that update image from the cache, or otherwise release the memory allocated to that image for storing new update image data.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

In addition, as mentioned above, one or more embodiments of the present invention may also be provided with a virtualization infrastructure. While virtualization methods may assume that virtual machines present interfaces consistent with a particular hardware system, virtualization methods may also be used in conjunction with virtualizations that do not correspond directly to any particular hardware system. Virtualization systems in accordance with various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system comprising a server for communicating with a client via a network, connection wherein said server is configured to:
   receive an update image for transmission to the client, the update image containing pixel data for a display frame and reflecting changes to a graphical user interface;
   encode and compress image data associated with the update image using a progressive encoding scheme that generates an encoded image data, the encoded image data including a first encoding pass sufficient to reproduce the update image at a first quality, and at least one successive encoding pass for refining the reproduced update image to a quality higher than the first quality;
   identify, based on available network bandwidth of the network connection, a first portion of the encoded image data for transmission to the client, the first portion of the encoded image data including at least the first encoding pass but less than a full length of the encoded image data;
   transmit the first portion of the encoded image data to the client via the network connection and an end-of-image marker appended to the first portion of the encoded image data;
   transmit at a later time and based on available network bandwidth an additional portion of the encoded image data to the client, the additional portion of the encoded image data immediately following the first portion so that the client can append the additional portion to the first portion to create a appended encoded image data for reproducing the update image at a refined quality;
   receive a second update image for transmission to the client, the second update image being subsequent to the update image;
   encode and compress image data associated with the second update image using a second progressive encoding scheme that generates a second encoded image data; and
   select a portion of the second encoded image data over a portion of the encoded image data for transmission to the client via the network connection if the number of transmitted encoding passes of the second encoded image data is less than the number of transmitted encoding passes of the encoded image data;
   wherein:
   the transmission of the first portion of the encoded image data is accompanied with transmission of meta data regarding the update image, the meta data including an index value corresponding to the update image, wherein the index value comprises a memory address that identifies the update image; and
   the transmission of the second portion of the encoded image data is accompanied with transmission of the index value corresponding to the update image such that the client can associate the additional portion with the first portion by comparing index values,
   wherein a portion of the second update image is transmitted before the full length of the update image is transmitted.

2. The system of claim 1, wherein the server is further configured to:
   store the encoded image data in a cache; and
   access the cache for the additional portion of the encoded image data when transmitting the additional portion.

3. The system of claim 2, wherein the update image is a current update image that is extracted from a frame buffer containing pixel data for a display frame, the extracted current update image representing a portion of the display having a width, a height, and an offset position within the display frame, the server being further configured to:
   determine if a previous update image is fully obscured by subsequent update images, including the current update image, the image being considered fully obscured when every pixel of the display frame associated with the previous update image is included in one of the subsequent update images; and
   evict image data corresponding to the previous update image from the cache when the previous update image is fully obscured by subsequent update images.

4. The system of claim 3, wherein said server is further configured to:
   determine if the previous update image is partially obscured by the current update image, the previous update image being considered to be partially obscured by the current update image when at least one pixel of the display frame associated with the previous update image is associated with the current update image and at least one pixel of the display frame associated with the previous update image is not associated with any subsequent update image;
   when the previous update image is partially obscured by the current update image, determine whether more network bandwidth is required to transmit additional image data for the previous update image to refine the previous update image to a good quality or transmitting at a good quality image data for a new update image containing the pixels of the display frame associated with the previous update image and not associated with any subsequent image;

evicting the previous update image from the cache when the transmitting of the additional image data for the previous update image requires greater network bandwidth than the transmitting of the new update image.

5. The system of claim 4, wherein said server is further configured to extract the new update image and transmit the new update image when the transmitting of the additional image data for the previous update image requires greater network bandwidth than the transmitting of the new update image.

6. The system of claim 1, wherein the encoded image data comprises a JPEG image encoded to a text string using a binary-to-text encoding scheme.

7. At least one computer-readable storage medium having computer-executable instructions embodied thereon, wherein, when executed by at least one processor, the computer-executable instructions cause the at least one processor to:

receive an update image for transmission to a client, the update image containing pixel data for a display frame and reflecting changes to a graphical user interface;

encode and compress image data associated with the update image using a progressive encoding scheme that generates an encoded image data, the encoded image data including a first encoding pass sufficient to reproduce the update image at a first quality, and at least one successive encoding pass for refining the reproduced update image to a quality higher than the first quality;

identify, based on available network bandwidth, a first portion of the encoded image data for transmission to the client, the first portion of the encoded image data including at least the first encoding pass but less than a full length of the encoded image data;

transmit the first portion of the encoded image data to the client via the network connection and an end-of-image marker appended to the first portion of the encoded image data;

transmit at a later time and based on available network bandwidth an additional portion of the encoded image data to the client, the additional portion of the encoded image data immediately following the first portion so that the client can append the additional portion to the first portion to create an appended encoded image data for reproducing the update image at a refined quality;

receive a second update image for transmission to the client, the second update image being subsequent to the update image;

encode and compress image data associated with the second update image using a second progressive encoding scheme that generates a second encoded image data; and select a portion of the second encoded image data over a portion of the encoded image data for transmission to the client via the network connection if the number of transmitted encoding passes of the second encoded image data is less than the number of transmitted encoding passes of the encoded image data;

wherein:

the transmission of the first portion of the encoded image data is accompanied with transmission of meta data regarding the update image, the meta data including an index value corresponding to the update image, wherein the index value comprises a memory address that identifies the update image; and the transmission of the second portion of the encoded image data is accompanied with transmission of the index value corresponding to the update image such that the client can associate the additional portion with the first portion by comparing index values, wherein a portion of the second update image is transmitted before the full length of the update image is transmitted.

8. The at least one storage medium of claim 7, wherein the computer-executable instructions further cause the at least one processor to:

store the encoded image data in a cache; and access the cache for the additional portion of the encoded image data when transmitting the additional portion.

9. The at least one storage medium of claim 8, wherein the update image is a current update image that is extracted from a frame buffer containing pixel data for a display frame, the extracted current update image representing a portion of the display having a width, a height, and an offset position within the display frame, the computer-executable instructions further causing the at least one processor to:

determine if a previous update image is fully obscured by subsequent update images, including the current update image, the image being considered fully obscured when every pixel of the display frame associated with the previous update image is included in one of the subsequent update images; and evict image data corresponding to the previous update image from the cache when the previous update image is fully obscured by subsequent update images.

10. The at least one storage medium of claim 9, wherein the computer-executable instructions further cause the at least one processor to:

determine if the previous update image is partially obscured by the current update image, the previous update image being considered to be partially obscured by the current update image when at least one pixel of the display frame associated with the previous update image is associated with the current update image and at least one pixel of the display frame associated with the previous update image is not associated with any subsequent update image;

when the previous update image is partially obscured by the current update image, determine whether more network bandwidth is required to transmit additional image data for the previous update image to refine the previous update image to a good quality or transmitting at a good quality image data for a new update image containing the pixels of the display frame associated with the previous update image and not associated with any subsequent image;

evicting the previous update image from the cache when the transmitting of the additional image data for the previous update image requires greater network bandwidth than the transmitting of the new update image.

11. The at least one storage medium of claim 10, wherein said computer executable instructions further cause the at least one processor to extract the new update image and transmit the new update image when the transmitting of the additional image data for the previous update image requires greater network bandwidth than the transmitting of the new update image.

12. The at least one storage medium of claim 7, wherein the encoded image data comprises a JPEG image encoded to a text string using a binary-to-text encoding scheme.

13. A method for transmitting image data, the method comprising:
- receiving an update image for transmission to a client, the update image containing pixel data for a display frame and reflecting changes to a graphical user interface;
- encoding and compressing image data associated with the update image using a progressive encoding scheme that generates an encoded image data, the encoded image data including a first encoding pass sufficient to reproduce the update image at a first quality, and at least one successive encoding pass for refining the reproduced update image to a quality higher than the first quality;
- identifying, based on available network bandwidth, a first portion of the encoded image data for transmission to the client, the first portion of the encoded image data including at least the first encoding pass but less than a full length of the encoded image data;
- transmitting the first portion of the encoded image data to the client via the network connection and an end-of-image marker appended to the first portion of the encoded image data;
- transmitting at a later time and based on available network bandwidth an additional portion of the encoded image data to the client, the additional portion of the encoded image data immediately following the first portion so that the client can append the additional portion to the first portion to create an appended encoded image data for reproducing the update image at a refined quality;
- receiving a second update image for transmission to the client, the second update image being subsequent to the update image;
- encoding and compressing image data associated with the second update image using a second progressive encoding scheme that generates a second encoded image data; and
- selecting a portion of the second encoded image data over a portion of the encoded image data for transmission to the client via the network connection if the number of transmitted encoding passes of the second encoded image data is less than the number of transmitted encoding passes of the encoded image data;

wherein:
- the transmitting of the first portion of the encoded image data is accompanied with transmission of meta data regarding the update image, the meta data including an index value corresponding to the update image, wherein the index value comprises a memory address that identifies the update image; and
- the transmitting of the second portion of the encoded image data is accompanied with transmission of the index value corresponding to the update image such that the client can associate the additional portion with the first portion by comparing index values,
- wherein a portion of the second update image is transmitted before the full length of the update image is transmitted.

14. The method of claim 13, further comprising:
storing the encoded image data in a cache; and
accessing the cache for the additional portion of the encoded image data for the transmitting of the additional portion.

15. The method of claim 14, wherein the update image is a current update image that is extracted from a frame buffer containing pixel data for a display frame, the extracted current update image representing a portion of the display having a width, a height, and an offset position within the display frame, the method further comprising:
- determining if a previous update image is fully obscured by subsequent update images, including the current update image, the image being considered fully obscured when every pixel of the display frame associated with the previous update image is included in one of the subsequent update images; and
- evicting image data corresponding to the previous update image from the cache when the previous update image is fully obscured by subsequent update images.

16. The method of claim 15, further comprising:
- determining whether the previous update image is partially obscured by the current update image, the previous update image being considered to be partially obscured by the current update image when at least one pixel of the display frame associated with the previous update image is associated with the current update image and at least one pixel of the display frame associated with the previous update image is not associated with any subsequent update image;
- when the previous update image is partially obscured by the current update image, determining whether more network bandwidth is required to transmit additional image data for the previous update image to refine the previous update image to a good quality or to transmit at a good quality image data for a new update image containing the pixels of the display frame associated with the previous update image and not associated with any subsequent image;
- evicting the previous update image from the cache when the transmitting of the additional image data for the previous update image requires greater network bandwidth than the transmitting of the new update image.

17. The method of claim 16, further comprising extracting the new update image and transmitting the new update image when the transmitting of the additional image data for the previous update image requires greater network bandwidth than the transmitting of the new update image.

18. The method of claim 13, wherein the encoded image data comprises a JPEG image encoded to a text string using a binary-to-text encoding scheme.

19. The system of claim 1, wherein the server is further configured to select the portion of the second encoded image data over the portion of the encoded image data for transmission to the client via the network connection if the number of transmitted encoding passes of the second encoded image data is identical with the number of transmitted encoding passes of the encoded image data and if a size of the portion of the second encoded image data is larger than a size of the portion of the encoded image data.

20. The system of claim 1, wherein the server is further configured to select the portion of the second encoded image data over the portion of the encoded image data for transmission to the client via the network connection if the number of transmitted encoding passes of the second encoded image data is identical with the number of transmitted encoding passes of the encoded image data and if the second encoded image data is stored in a cache prior to the encoded image data is stored in the cache.

21. The system of claim 1, wherein the server is further configured to select the portion of the second encoded image data over the portion of the encoded image data for transmission to the client via the network connection if the number of transmitted encoding passes of the second encoded image data is identical with the number of transmitted encoding passes of the encoded image data and if the second encoded image data is stored in a cache subsequent to the encoded image data is stored in the cache.

* * * * *